United States Patent
Yoshida et al.

(10) Patent No.: US 9,442,468 B2
(45) Date of Patent: Sep. 13, 2016

(54) CONTROL APPARATUS AND SHIFT-BY-WIRE SYSTEM HAVING THE SAME

(71) Applicant: DENSO CORPORATION, Kariya, Aichi-pref. (JP)

(72) Inventors: Kazuhiro Yoshida, Tokoname (JP); Jun Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 14/559,284

(22) Filed: Dec. 3, 2014

(65) Prior Publication Data

US 2015/0160625 A1    Jun. 11, 2015

(30) Foreign Application Priority Data

Dec. 6, 2013  (JP) .................................. 2013-253031
Dec. 6, 2013  (JP) .................................. 2013-253032

(51) Int. Cl.
| | | |
|---|---|---|
| G05B 13/00 | (2006.01) |
| H02P 25/00 | (2006.01) |
| G05B 13/02 | (2006.01) |
| G06N 99/00 | (2010.01) |

(52) U.S. Cl.
CPC ........... G05B 13/0265 (2013.01); H02P 25/00 (2013.01); G06N 99/005 (2013.01)

(58) Field of Classification Search
CPC ............. G06N 99/005; B60L 11/1805; B60L 11/1861; B60L 15/2045; B60L 2250/26; B60L 2260/30; B60L 7/003; B60L 7/12; F16H 2061/1208; F16H 2061/1216; F16H 61/12; F16H 61/32; G05B 13/0265; G05B 19/048

USPC ................. 318/139, 400.01, 400.02, 400.22, 318/400.32, 430–434, 561
See application file for complete search history.

(56) References Cited

U.S. PATENT DOCUMENTS

| | | | | |
|---|---|---|---|---|
| 5,371,645 A * | 12/1994 | Mochizuki | ........... | H02H 7/0833 361/22 |
| 7,053,581 B2 * | 5/2006 | Chen | .................... | B60L 11/1803 318/432 |
| 7,106,017 B2 * | 9/2006 | Kifuku | ................. | H02H 7/0833 318/400.02 |
| 7,650,760 B2 * | 1/2010 | Nakata | ...................... | H02P 6/06 318/722 |
| 8,207,694 B2 * | 6/2012 | Izumi | ...................... | B60K 6/48 318/400.01 |
| 8,288,979 B2 * | 10/2012 | Bates | ....................... | H02P 1/04 310/184 |

(Continued)

OTHER PUBLICATIONS

Yoshida et al., U.S. Appl. No. 14/559,175, filed Dec. 3, 2014.

(Continued)

*Primary Examiner* — Paul Ip
(74) *Attorney, Agent, or Firm* — Nixon & Vanderhye P.C.

(57) ABSTRACT

A control apparatus controlling a motor for driving an object includes: a relay allowing and interrupting electric power supply to the motor; switching devices in multiple phases for allowing and interrupting energization to windings; a controller for the relay and the switching devices; a current detecting circuit for a current flowing through a merging point of the windings and the switching devices; a current limit circuit for keeping an average of the current within a predetermined range; a standard position learning device for learning a standard position of the motor; a voltage detecting circuit for detecting a voltage applied to each switching device; and an error detecting device for detecting an error in the current detecting circuit based on the voltage and the current when the relay turns on, and all switching devices turn off.

18 Claims, 5 Drawing Sheets

(56) References Cited

U.S. PATENT DOCUMENTS

| | | | | |
|---|---|---|---|---|
| 8,381,869 B2* | 2/2013 | Fujimoto | ............... | B62D 5/046 180/443 |
| 8,541,965 B2* | 9/2013 | Ueda | ...................... | B62D 5/046 318/400.02 |
| 2002/0109474 A1* | 8/2002 | Kifuku | ................. | H02H 7/0833 318/434 |
| 2005/0285556 A1* | 12/2005 | Chen | ................... | B60L 11/1803 318/432 |
| 2006/0179859 A1* | 8/2006 | Nakata | ...................... | H02P 6/06 62/228.1 |
| 2006/0207373 A1 | 9/2006 | Amamiya et al. | | |
| 2008/0047776 A1* | 2/2008 | Kobayashi | ............. | B62D 5/046 180/446 |
| 2010/0052581 A1* | 3/2010 | Izumi | ...................... | B60K 6/48 318/400.04 |
| 2010/0066293 A1* | 3/2010 | Iriguchi | ................. | F02N 11/08 318/478 |
| 2010/0253140 A1* | 10/2010 | Yamashita | ........... | B62D 5/0457 307/9.1 |
| 2011/0025238 A1* | 2/2011 | Ueda | ...................... | B62D 5/046 318/400.02 |
| 2011/0272205 A1* | 11/2011 | Fujimoto | ............... | B62D 5/046 180/446 |
| 2013/0076290 A1* | 3/2013 | Yoshida | ............. | G01D 5/24476 318/652 |
| 2013/0200826 A1* | 8/2013 | Yoshida | ................. | H02P 6/205 318/400.11 |
| 2013/0229136 A1* | 9/2013 | Bates | ...................... | H02P 25/18 318/400.41 |

OTHER PUBLICATIONS

Yoshida, U.S. Appl. No. 14/559,144, filed Dec. 3, 2014.
Yamada, U.S. Appl. No. 14/559,250, filed Dec. 3, 2014.

* cited by examiner

| RELAY | ON | | | |
|---|---|---|---|---|
| MOS (ALL PH) | OFF | | | |
| $V_i$ | HI | HI | LO | LO |
| I | LO | HI | LO | HI |
| DIAG RESULT | NORMAL | PLUS-OFFSET ERROR OF CUR DET CIR | LINE BREAK ERROR FROM POW S TO MOS, OR RELAY OFF-STATE ERROR | MOS ON-STATE ERROR |

| RELAY | ON | | | |
|---|---|---|---|---|
| MOS (ALL PH) | OFF | | | |
| CONST CUR CIR OUTPUT | $I_{const}$ | | | |
| $V_i$ | HI | HI | LO | LO |
| I | $\approx I_{const}$ | $\neq I_{const}$ | $\approx I_{const}$ | $\neq I_{const}$ |
| DIAG RESULT | NORMAL | OFFSET ERROR OF CUR DET CIR | LINE BREAK ERROR FROM POW S TO MOS, OR RELAY OFF-STATE ERROR | MOS ON-STATE ERROR |

CONTROL APPARATUS AND
SHIFT-BY-WIRE SYSTEM HAVING THE
SAME

CROSS REFERENCE TO RELATED
APPLICATIONS

This application is based on Japanese Patent Applications No. 2013-253032 on Dec. 6, 2013, and No. 2013-253031 filed on Dec. 6, 2013, the disclosures of which are incorporated herein by reference.

TECHNICAL FIELD

The present disclosure relates to a control apparatus for controlling an operation of a motor and a shift-by-wire system having the same.

BACKGROUND

Conventionally, in a vehicular control technique, a by-wire system for electrically controlling an actuator of changing a vehicle state with a by-wire control circuit according to an instruction from a driver of a vehicle is well known. For example, Patent document No. 1 teaches a shift-by-wire system for switching a shift lever according to an instruction of the driver. In the system, the operation of the actuator having a brushless motor is controlled so that the shift range is changed by rotatably driving a detent plate in a shift range switching device.

In the shift-by-wire system according to Patent document No. 1, based on a counting value of a pulse signal of an encoder for outputting the pulse signal at every predetermined angle in synchronization with a rotation of the motor, the shift range is switched to a target range by rotating the motor to reach a target rotation position, which corresponds to the target range, when the shift range is switched. Further, in the shift-by-wire system according to Patent document No. 1, before starting a switching control of the shift range, i.e., before starting a normal driving control of the motor, the system rotates the motor until the detent plate stops at a limitation position in a movable range so that a standard position learning control for learning a standard position of the motor is performed. When the system learns the standard position, the limitation position coincides with the standard position of the motor. Thus, after that, the system can perform the normal driving control for rotating the motor toward the target rotation position.

Here, when the standard position learning control is executed in a system for controlling a current flowing through each phase of the motor according to a duty ratio corresponding to a voltage, even if the voltage is same, the current flowing through each phase of a winding of the motor may change according to a change of a winding resistance caused by temperature change and/or chronological change, so that the torque of the motor is changed. Thus, the accuracy of the standard position learning control may be reduced. This view point is not considered in the system according to Patent document No. 1. Thus, in the system according to Patent document No. 1, the accuracy of the standard position learning control may be reduced according to the condition change such as the temperature change or the chronological change.

When the standard position learning control is performed, the current flowing through the windings is limited so as to reach the sum of current flowing through each phase of the winding of the motor to be within a predetermined current range. Thus, the change of the current in each phase caused by the temperature change or the chronological change is restricted, so that the accuracy of the standard position learning control is improved even if the condition is changed. However, when the system includes a physical circuit for detecting the sum of the current flowing through each phase of the winding of the motor, and a physical circuit for restricting the current flowing through the windings, if the circuit is damaged, the standard position may not be learned properly.

(Patent document No. 1) JP-2004-308752-A corresponding to US 2006/0207373 A1

SUMMARY

It is an object of the present disclosure to provide a control apparatus detecting an operation error of the circuit relating to the standard position learning and having high accuracy of the standard position learning control. It is another object of the present disclosure to provide a shift-by-wire system having a control apparatus.

According to a first aspect of the present disclosure, a control apparatus controls a motor, which has a plurality of windings respectively corresponding to a plurality of phases, and is supplied an electric power from a power source so that the motor rotates, for rotating and driving an object. The control apparatus includes: a relay, which is arranged between the power source and the motor, allows electric power supply from the power source to the motor when the relay turns on, and interrupts the electric power supply from the power source to the motor when the relay turns off; a plurality of switching devices, each of which corresponds to one of the plurality of phases, allows energization to a corresponding winding when the switching device turns on, and interrupts the energization to the corresponding winding when the switching device turns off; a controller that controls the relay and the switching devices to turn on and off so that the controller controls an operation of the motor; a current detecting circuit that is connected to a merging point, at which current flowing through the windings and the switching devices merge, and detects a current flowing through the merging point; a current limit circuit that limits the current flowing through each winding and each switching device to keep an average of the current detected by the current detecting circuit within a predetermined range; a standard position learning device that learns a standard position of the motor in such a manner that the current limit circuit limits the current flowing through each winding and each switching device, and the controller controls the motor to rotate until the object stops at a limit position of a movable range; a voltage detecting circuit that detects a voltage applied to each switching device; and an error detecting device that detects an error in the current detecting circuit based on the voltage detected by the voltage detecting circuit and the current detected by the current detecting circuit when the relay turns on, and all of the switching devices turn off.

In the present disclosure, when the standard position of the motor is learned, the current flowing through the windings and the switching devices is restricted by the current limit circuit based on the current detected by the current detecting circuit, and the motor is rotated. Thus, the change of the current in each phase caused by the temperature change and the chronological change, and the change of the torque of the motor are restricted. Thus, the learning accuracy of the standard position is improved even if the conditions are changed, for example, the temperature change and the chronological change occur.

In the present disclosure, the error detecting device detects the error in the current detecting circuit based on the voltage detected by the voltage detecting circuit and the current detected by the current detecting circuit. Thus, the standard position learning operation under a condition that the error occurs at the current detecting circuit is avoidable. Accordingly, the erroneous operation in the motor and loss of control of the motor caused by the erroneously learned standard position are restricted.

According to a second aspect of the present disclosure, a shift-by-wire system includes: a control apparatus; a motor controlled by the control apparatus; and an object rotated and driven by the motor. The object has a shift range, which is switchable by an operation of the motor. The control apparatus has a plurality of windings respectively corresponding to a plurality of phases, and is supplied an electric power from a power source so that the motor rotates. The control apparatus includes: a relay, which is arranged between the power source and the motor, allows electric power supply from the power source to the motor when the relay turns on, and interrupts the electric power supply from the power source to the motor when the relay turns off; a plurality of switching devices, each of which corresponds to one of the plurality of phases, allows energization to a corresponding winding when the switching device turns on, and interrupts the energization to the corresponding winding when the switching device turns off; a controller that controls the relay and the switching devices to turn on and off so that the controller controls an operation of the motor; a current detecting circuit that is connected to a merging point, at which current flowing through the windings and the switching devices merge, and detects a current flowing through the merging point; a current limit circuit that limits the current flowing through each winding and each switching device to keep an average of the current detected by the current detecting circuit within a predetermined range; a standard position learning device that learns a standard position of the motor in such a manner that the current limit circuit limits the current flowing through each winding and each switching device, and the controller controls the motor to rotate until the object stops at a limit position of a movable range; a voltage detecting circuit that detects a voltage applied to each switching device; and an error detecting device that detects an error in the current detecting circuit based on the voltage detected by the voltage detecting circuit and the current detected by the current detecting circuit when the relay turns on, and all of the switching devices turn off.

In the present disclosure, the learning accuracy of the standard position is improved even if the conditions are changed, for example, the temperature change and the chronological change occur. Further, the standard position learning operation under a condition that the error occurs at the current detecting circuit is avoidable. Accordingly, the erroneous operation in the motor and loss of control of the motor caused by the erroneously learned standard position are restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be explained with reference to drawings.

Embodiments

Figure 1:
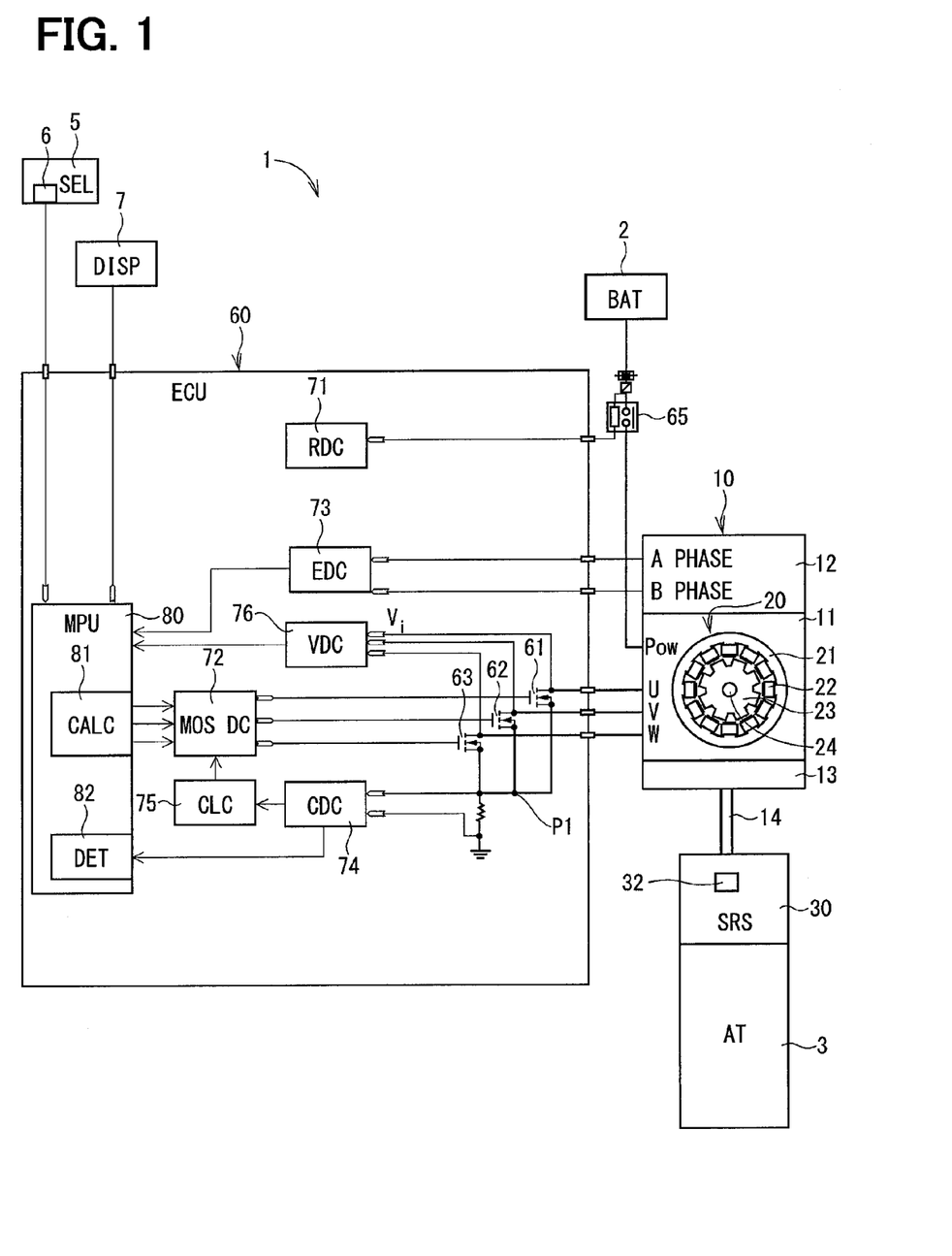
FIG. 1 is a diagram showing a shift-by-wire system having an electric control apparatus according to an example embodiment of the present disclosure.

A control apparatus according to an example embodiment and a shift-by-wire system having the control apparatus are shown in FIG. 1.

The shift-by-wire system 1 includes an actuator 10, a shift range switching device 30, an electric control unit (i.e., ECU) 60 as the control apparatus, and the like. The system 1 is mounted on a vehicle together with an automatic transmission 3, for example. The system 1 drives the actuator 10 and the shift range switching device 30 according to an instruction of a driver of the vehicle, so that the shift range of the automatic transmission 3 is switched by the by-wire control.

The actuator 10 includes a housing 11, a motor 20, an encoder 12, a reducer 13, and an output shaft 14.

In the present example embodiment, the motor 20 is, for example, a switched reluctance motor (i.e., SR motor), which is a three-phase driving type brushless motor for generating a driving force without using a permanent magnet. The motor 20 includes a stator 21, a winding 22, a rotor 23 and a motor shaft 24.

The stator 21 has a ring shape by stacking multiple iron plates, for example. The stator 21 is accommodated in the housing 11 so as to be fixed in the housing 11. The stator 21 includes multiple protrusion poles, which protrude toward a radially inside direction and are arranged along a circumference at equal intervals. In the present embodiment, the stator 21 includes twelve protrusion poles.

The windings 22 are winded around the protrusion poles of the stator 21. Here, each winding 22 corresponds to one of multiple phases of the motor 20 (i.e., one of a U phase, a V phase and a W phase). In the present embodiment, four windings 22 of twelve windings 22 correspond to one of the U phase, the V phase and the W phase.

The rotor 23 has a cylinder shape by stacking multiple iron plates. The rotor 23 is rotatably arranged in the stator 21. The rotor 23 includes multiple protrusions, which protrude toward a radially outside direction and are arranged along a circumference at equal intervals. In the present embodiment, the rotor 23 includes eight protrusions.

The motor shaft 24 is integrated with the rotor 23 at the center of the rotor 23, and the motor shaft 24 together with the rotor 23 are rotatable. The motor shaft 24 is rotatably supported by the housing 11. Thus, the rotor 23 together with the motor shaft 24 is rotatable inside of the stator 21.

When the energization to the winding 22 of each phase in the motor 20 is switched sequentially, the rotation magnetic field is generated at the stator 21, so that the rotor 23 rotates.

Thus, the motor 20 rotates when the electric power is supplied from a battery 2 as a power source of the vehicle. The ECU 60 controls the driving operation of the motor 20 by switching the energization to the winding 22 of each phase supplied from the battery 2.

The encoder 12 is arranged in the housing 11 of the actuator 10. The encoder 12 includes a magnet integrally rotatable with the rotor 23, and a magnetic field detection Hall IC mounted on a substrate, which is fixed to the housing 11. The Hall IC is opposed to the magnet, and detects that a magnetic flux generating unit passes through the Hall IC. In the present embodiment, the encoder 12 outputs a pulse signal in a A phase and a pulse signal in a B phase according to a change of a rotation angle of the motor 20 (i.e., the rotor 23).

The reducer 13 reduces the rotation motion, i.e., rotation speed of the motor shaft 24 in the motor 20, and then, outputs the reduced rotation motion via the output shaft 14. Thus, the reducer 13 transmits the rotation motion to the shift range switching device 30. The shift range switching device 30 transmits the rotation driving force, which is transmitted from the reducer 13, to a manual valve 4 and a parking lock mechanism 50, as shown in FIG. 2.

Figure 2:
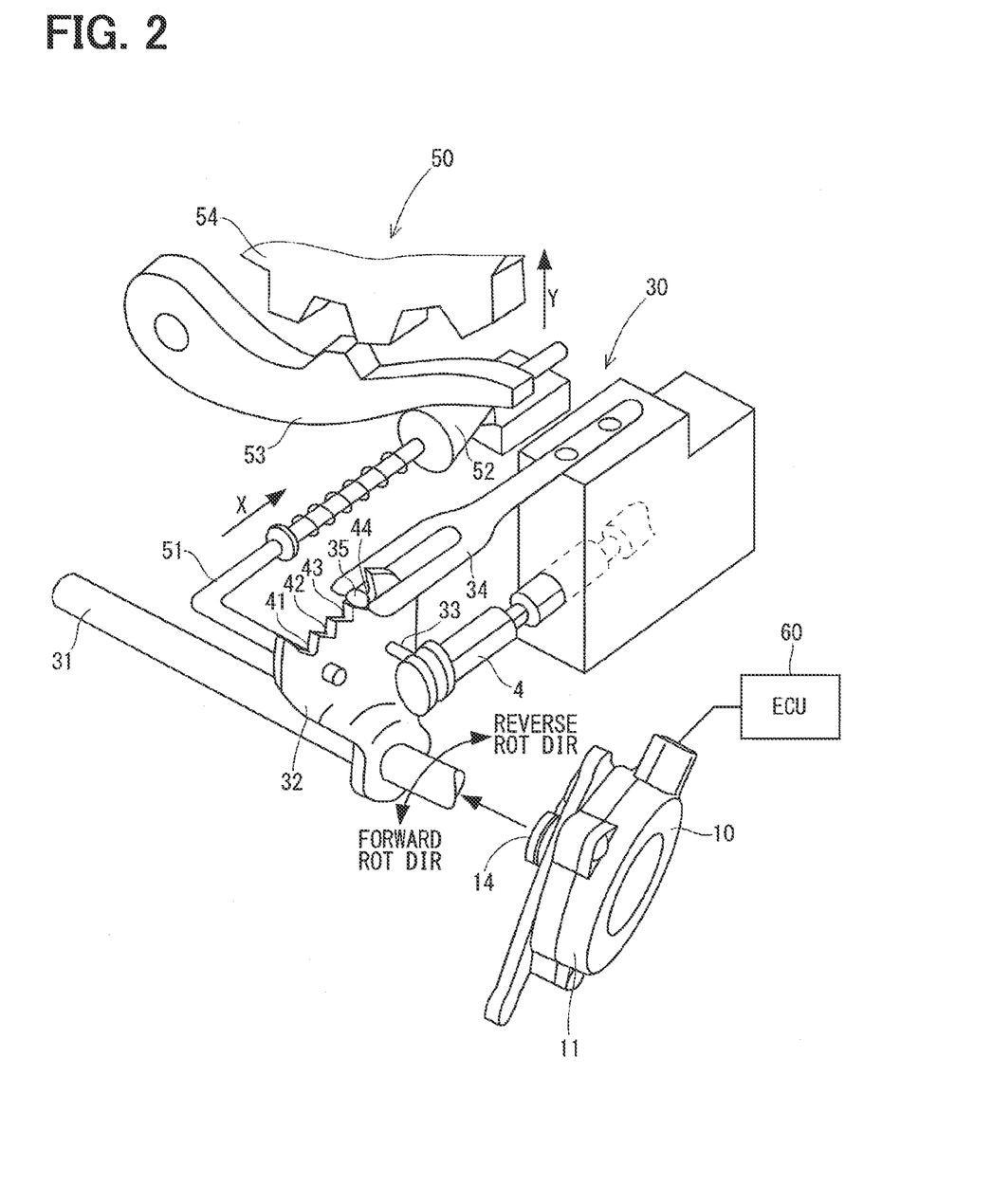
FIG. 2 is a diagram showing a perspective view of a shift range switching device in FIG. 1.

As shown in FIG. 2, the shift range switching device 30 includes a manual shaft 31, a detent plate 32 and a detent spring 34. The manual shaft 31 is connected to the output shaft 14 of the actuator 10. The shaft 31 is driven and rotated by a rotation driving force of the motor 20. The detent plate 32 protrudes from the manual shaft 31 toward the radially outside direction. The detent plate 32 is integrated with the manual shaft 31. Thus, the manual shaft 31 together with the detent plate 32 are rotated and driven by the actuator 10. The detent plate 32 corresponds to a driven object.

A pin 33 is formed on the detent plate 32, and the pin 33 protrudes toward a direction in parallel to the manual shaft 31. The pin 33 is connected to the manual valve 4. Accordingly, when the detent plate 32 rotates together with the manual shaft 31, the manual valve 4 moves along the axial direction in a reciprocal motion. Specifically, the shift range switching device 30 converts the rotation motion of the actuator 10 to be a linear motion, and then, transmits the linear motion to the manual valve 4.

The detent plate 32 includes concavities 41-44 on an outer periphery in a radial direction. The concavity 41 is formed on the detent plate 32 on one end in the rotation direction. The concavity 44 is formed on the detent plate 32 on the other end in the rotation direction. The concavities 42, 43 are formed between the concavities 41, 44.

In the present embodiment, the concavity 41 corresponds to a P range (i.e., parking range) of the shift range in the automatic transmission 3. The concavity 42 corresponds to a R range (i.e., reverse range). The concavity 43 corresponds to a N range (i.e., neutral range) of the shift range in the automatic transmission 3. The concavity 44 corresponds to a D range (i.e., drive range).

The detent spring 34 is elastically deformable. The detent spring 34 has a detent roller 35 on a top end of the spring 34 as a limiter. The detent spring 34 pushes the detent roller 35 toward a center of the detent plate 32 (corresponds to the center of the manual shaft 31). When a predetermined rotation force in the rotation direction is applied to the detent plate 32 via the manual shaft 31, the detent roller 35 hops over one of convexities formed among the concavities 41-44 and moves to a next concavity 41-44, which is adjacent to a current concavity 41-44. Accordingly, when the actuator 10 rotates the manual shaft 31, the position of the manual valve 4 in the axial direction and the state of the parking lock mechanism 50 are changed, so that the shift range of the automatic transmission 3 is changed. Here, when the detent roller 35 hops over one of convexities among the concavities 41-44, the detent spring 34 is bent and elastically deformed. Further, at this time, the detent roller 35 rotates, and moves among the concavities 41-44 and the convexities.

When the detent roller 35 is engaged with one of the concavities 41-44, the rotation of the detent plate 32 is limited. Thus, the position of the manual valve 4 in the axial direction and the state of the parking lock mechanism 50 are defined. Further, the shift range of the automatic transmission 3 is fixed. Thus, the detent plate 32 and the detent roller 35 function as a detent mechanism.

In the present embodiment, when the shift range is switched from the P range to the R range, the N range or the D range, the rotating direction of the output shaft 14 in the actuator 10 is defined as the forward rotation direction. On the other hand, when the shift range is switched from the D range to the N range, the R range, or the P range, the rotating direction of the output shaft 14 in the actuator 10 is defined as the reverse rotation direction.

FIG. 2 shows a state of the parking lock mechanism 50 when the shift range is the D range, i.e., when the shift range is not the P range. In this acse, the parking gear 54 is not locked by the parking lock pole 53. Accordingly, the rotation of the automatic transmission 3 is not prevented. When the output shaft 14 of the actuator 10 rotates in the reverse rotation direction from this state, the rod 51 is pushed toward a X direction in FIG. 2 via the detent plate 32. Further, the taper portion 52 arranged on the top end of the rod 51 is pushed up in a Y direction in FIG. 2. Thus, the parking lock pole 53 is engaged with the parking gear 54, so that the parking gear 54 is locked. As a result, the rotation of the automatic transmission 3 is limited. In this case, the detent roller 35 of the detent spring 34 is engaged with the concavity 41 of the detent plate 32 (i.e., the detent roller 35 is disposed at the center of the concavity 41). The actual range of the automatic transmission 3 (which is defined as an actual range) is the P range.

Next, the detail of the ECU 60 will be explained as follows.

As shown in FIG. 1, the ECU 60 is a small computer having a MPU 80 as a calculation device, a RAM and a ROM as a memory device, various circuits and input/output device. The ECU 60 controls various devices and elements according to various programs stored in the Rom based on data stored in the RAM and the ROM and signals input from various sensors mounted on the vehicle. The ECU 60 is electrically coupled with the battery 2 as a power source of the vehicle. The ECU 60 is energized by the electricity supplied from the battery 2.

Specifically, the ECU 60 includes a relay 65, MOS transistors 61-63, a relay drive circuit 71, a MOS driving circuit 72, an encoder detecting circuit 73, a current detecting circuit 74, a current limiting circuit 75, a voltage detecting circuit 76 and a MPU 80.

The relay 65 is arranged between the battery 2 and the motor 20. The relay 65 allows supplying the electricity from the battery 2 to the motor 20 when the relay 65 turns on. When the relay 65 turns off, the electric power supply from the battery 2 to the motor 20 is interrupted.

The MOS transistors 61-63 are switching elements such as a MOS-FET. Three MOS transistors 61-63 are arranged so as to correspond to three phases of the windings 22 in the motor 20. The drain terminal of the MOS transistor 61 is connected to the winding 22 in the U phase via a wire, the drain terminal of the MOS transistor 62 is connected to the winding 22 in the V phase via a wire, and the drain terminal of the MOS transistor 63 is connected to the winding 22 in the W phase via a wire.

The source terminal of each MOS transistor 61-63 is connected to one end of the wire. The other end of the wire connected to each MOS transistor 61-63 is connected to each other, so that the merging point P1 is formed. The merging point P1 is connected to a ground, i.e., a low potential side of the battery 2, via the resistor.

The MPU 80 is a semiconductor chip for executing various processes.

The relay driving circuit 71 is connected to the relay 65. The relay driving circuit 71 outputs the on-state signal to the relay 65, so that the relay driving circuit 71 turns on the relay 65. Thus, the relay 65 is in the on-state. In the present embodiment, when the on-state signal is not received by the relay 65, the relay 65 is in the off-state.

The MPU 80 controls the relay driving circuit 71 so that the MPU 80 controls the relay 65 to turn on and off. When the relay 65 is in the on-state, the electric power is supplied from the battery 2 to the motor 20, so that the motor 20 is rotatable.

The MOS driving circuit 72 is connected to the gate terminal of each MOS transistor 61-63. The MOS driving circuit 72 outputs the on-state signal (i.e., a driving signal) to the gate terminal of each MOS transistor 61-63, so that the circuit 72 turns on the MOS transistor 61-63. Thus, the MOS transistor 61-63 is in the on-state. When the on-state signal is not received by the MOS transistor 61-63, the transistor 61-63 is in the off state.

The MPU 80 includes a driving signal calculation device 81 as a functional device. The MPU 80 calculates the driving signal with respect to the MOS transistors 61-63 using the driving signal calculation device 81. The MPU 80 controls the MOS driving circuit 72 to output the calculated driving signal from the MOS driving circuit 72, so that the MPU 80 controls the MOS transistors 61-63 to turn on and off. For example, when the relay 65 is in the on-state, and the MOS transistor 61 is controlled to turn on, the current flows through the winding 22 in the U phase. When the relay 65 is in the on-state, and the MOS transistor 62 is controlled to be in the on-state, the current flows through the winding 22 in the V phase. When the relay 65 is in the on-state, and the MOS transistor 63 is controlled to be in the on-state, the current flows through the winding 22 in the W phase. On the other hand, when the MOS transistor 61-63 is in the off state, the current does not flow through the winding 22 corresponding to the MOS transistor 61-63. Here, the MOS transistor 61-63 corresponds to a switching device.

The MPU 80 controls the MOS transistors 61-63 to turn on and off via the MOS driving circuit 72, so that the MPU 80 and the circuit 72 control the driving operation of the motor 20. The MPU 80 (i.e., the driving signal calculation device 81) and the MOS driving circuit 72 correspond to a control apparatus or controller.

The encoder detecting circuit 73 is connected to the encoder 12. The encoder 12 outputs the pulse signal in the A phase and the B phase to the encoder detecting circuit 73 according to the change amount of the rotation angle of the motor 20 (i.e., the rotor 23). The ECU 60 detects the pulse signal of the encoder 12 detected by the encoder detecting circuit 73.

In the present embodiment, the encoder 12 is an incremental type element so that the encoder 12 outputs a pulse signal in a A phase and a pulse signal in a B phase according to a change of a rotation angle of the motor 20. The ECU 60 reduces (i.e., counts down) or increases (i.e., counts up) a counting value (i.e., a counting value of the pulse signal) according to the pulse signal output from the encoder 12. Thus, the ECU 60 detects the rotation state of the motor 20 (i.e., the rotor 23). Thus, since the ECU 60 detects the rotation state of the motor 20 using the encoder 12, the motor 20 is driven at high rotating speed without deviating from a proper operation. An initial driving control operation for learning a magnetizing and energizing phase of the motor 20 is executed at every time when the power source of the vehicle turns on. Specifically, the initial driving control operation for synchronizing the counting value according to the pulse signal output from the encoder 12 with the energizing phase is executed at every time of the activation of the shift-by-wire system 1. In the initial driving control operation, the rotation of the actuator 10 is appropriately controlled.

The current detecting circuit 74 is connected to the merging point P1, at which the current flowing through the windings 22 and the MOS transistors 61-63 merges. Thus, the circuit 74 detects the current flowing through the merging point P1. The MPU 80 detects the current flowing through the merging point P1 using the current detecting circuit 74.

The current limiting circuit 75 is connected to the current detecting circuit 74 and the MOS driving circuit 72. The current limiting circuit 75 controls the MOS driving circuit 72 to reach an average of the current detected by the current detecting circuit 74 to be within a predetermined range. Thus, the circuit 75 limits the current flowing through the windings 22 and the MOS transistors 61-63.

The voltage detecting circuit 76 is connected to the drain terminal of each MOS transistor 61-63. Thus, the voltage detecting circuit 76 detects the voltage (i.e., Vi), which is applied to the drain terminal of each MOS transistor 61-63. Here, the suffix i indicates one of U, V, W. The voltage Vu is the voltage applied to the MOS transistor 61 in the U phase. The voltage Vv is the voltage applied to the MOS transistor 62 in the V phase. The voltage Vw is the voltage applied to the MOS transistor 63 in the W phase. The MPU 80 detects the voltage applied to the drain terminal of each MOS transistor 61-63.

The ECU 60 is electrically connected to the selector sensor 6 in the range selector 5 as a shift selection device, as shown in FIG. 1.

The selector sensor 6 detects the shift range, which is instructed by the driver of the vehicle using the range selector 5, and defined as an instructed shift range. A signal indicative of the instructed shift range is output to the MPU 80 in the ECU 60.

The MPU 80 sets the target range based on the signal indicative of the instructed shift range output from the selector sensor 6. In the embodiment, the target range is set according to the signal of the selector sensor 6, the signal of the brake, and the signal of the vehicle speed sensor and the like. The ECU 60 controls the rotation of the actuator 10 so as to be the determined target shift range. Specifically, the ECU 60 rotates the motor 20 to be at the target rotation position corresponding to the target range. Thus, the shift range is switched to the target range. Thus, the actual range of the automatic transmission 3 is switched to the required range of the driver.

Here, since the encoder 12 in the present embodiment is an incremental type encoder, the encoder 12 detects only a relative rotation position of the motor 20 (i.e., the rotor 23). Accordingly, when the motor 20 is rotated and the shift range is switched to the required shift range, it is necessary to learn a standard position corresponding to the absolute position of the motor 20 and to match the limit position of the movable range (i.e., the rotatable range) of the detent plate 32 to the standard position. After learning the standard position of the motor 20, the rotation position of the motor 20 corresponding to the required shift range is calculated according to the standard position and the predetermined rotation amount (i.e., a control constant). The motor 20 is rotated so as to be at the calculated rotation position, so that the actual range is switched to the required shift range. In the present embodiment, the MPU 80 learns the standard position of the motor 20 corresponding to the end (i.e., the P range or the D range) of the movable range of the detent plate 32.

The MPU 80 detects indirectly the actual range by calculating the accrual range based on the standard position, the predetermined rotation amount, and the counting value of the pulse signal from the encoder 12, which is equal to the rotation position of the motor 20, after executing the standard position learning control operation. In the present embodiment, the information about the detected actual range is displayed on the display device 7, which is arranged in front of the driver seat in the vehicle. Thus, the driver can recognize the actual range at that time. In the present embodiment, the actual range is detected based on the rotation position of the motor 20 when the center of the detent roller 35 is disposed within one of the concavities 41-44, which correspond to the shift ranges of the detent plate 32 (i.e., the P range, the R range, the N range and the D range).

Here, when the standard position learning control operation is performed by the MPU 80, and the current flowing through each phase of the winding 22 of the motor 20 is controlled with a duty ratio corresponding to the voltage, the learning accuracy of the standard position may be reduced since the torque of the motor 20 is changed according to a change of the current flowing through each phase of the winding 22 in the motor 20 caused by the change of the winding resistance such as temperature change or chronological change even if the voltage is same.

Thus, In the present embodiment, the MPU 80 limits the current flowing through the windings 22 and the MOS transistors 61-63 so that the average of the current flowing through the merging point P1 is within the predetermined range when the standard position learning control operation is performed. Thus, the change of the current flowing through each phase caused by the temperature change and/or the chronological change is restricted, and therefore, the learning accuracy of the standard position is improved notwithstanding the condition.

In the present embodiment, the MPU 80 restricts the current flowing through the windings 22 and the MOS transistors 61-63 using the current limiting circuit 75, and rotates the motor 20 until the detent plate 32 stops at the limit position of the movable range (i.e., the position corresponding to the P range or the D range). In this case, the MPU 80 rotates the motor with the two-phase energizing method such that two phases among three phases of the windings 22 are energized, and the energizing phases are switched in turn. The MPU 80 learns the standard position based on the counting value of the pulse signal from the encoder 12 after a predetermined time has elapsed since the motor 20 stops rotating.

In the present embodiment, the MPU 80 restricts the current flowing through the windings 22 and the MOS transistors 61-63 using the current limiting circuit 75, and rotates the motor 20 until the detent plate 32 stops at the limit position of the movable range, so that the MPU 80 learns the standard position. Here, the MPU 80 corresponds to the standard position learning device. Further, the control operation of the MPU 80 relating to the standard position learning operation is defined as the standard position learning control operation. When the standard position learning control operation is performed, the motor 20 is rotated until the detent roller 35 hits on the wall of the concavity 41 or the concavity 44, which corresponds to the P range or the D range. Thus, the standard position learning control operation is defined as a hitting-wall learning control operation or a contact learning control operation.

The MPU 80 normally detects the rotation position of the rotor 23 with respect to the stator 21 according to the counting value of the pulse signal from the encoder 12, and switches the energization phase of the windings 22 of the motor 20 in turn, so that the MPU 80 rotates and drives the rotor 23 toward the target rotation position. Thus, the MPU 80 feedbacks the rotation state of the rotor 23 (i.e., the motor 20), and rotates and drives the motor 20, so that the shift range is switched to the target range. The above control operation of the MPU 80 is defined as the normal driving control operation.

Next, the control operation of the motor 20 using the MPU 80 will be explained with reference to FIG. 3.

Figure 3:
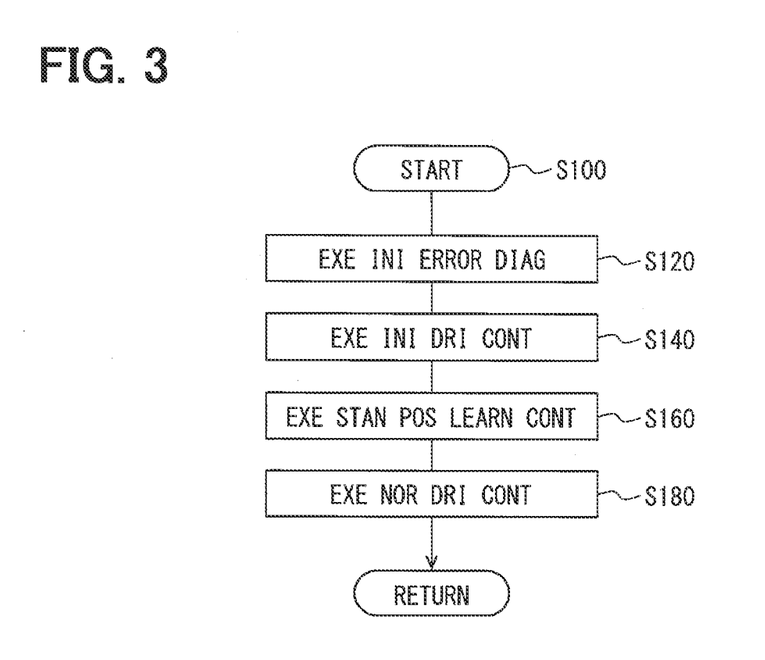
FIG. 3 is a flowchart showing a process relating to a motor control using the electric control apparatus.

The process S100 shown in FIG. 3 starts when the ignition switch turns on, i.e., the power source of the vehicle turns on so that the shift-by-wire system 1 is activated.

At step S120, the MPU 80 executes the initial error diagnosis. Specifically, the MPU 80 diagnoses whether an error occurs at each part of the shift-by-wire system 1 such as the relay 65. The detailed error diagnosis method at step S120 will be explained later. When the error is detected, the error of the shifty-by-wire system 1 is notified to the driver such that the warning light of the display device 7 turns on. When the error is not detected at step S120, it goes to step S140.

At step S140, the MPU 80 executes the initial driving control operation. Thus, the rotation of the actuator 10 (i.e., the motor 20) is appropriately controlled. After step S140, it goes to step S160.

At step S150, the MPU 80 executes the standard position learning control operation. Thus, the limit position of the movable range of the detent plate 32 coincides with the standard position, and therefore, the motor can be operated in the normal driving control operation. Here, when the MPU 80 executes the standard position learning control operation, the MPU 80 restricts the current flowing through the windings 22 and the MOS transistors 61-63 using the current limiting circuit 75, and rotates the motor 20. After step S160, it goes to step S180.

At step S180, the MPU 80 starts to execute the normal driving control operation. Thus, the shift range of the automatic transmission 3 is switched to a required shift range of the driver.

When the ignition switch turns off, the process ends.

The MPU 80 includes an error detecting device 82 as a functional device. Next, a process relating to the error detection of the current detecting circuit 74 executed by the error detecting device 82 in the MPU 80 will be explained with reference to FIG. 4.

Figure 4:
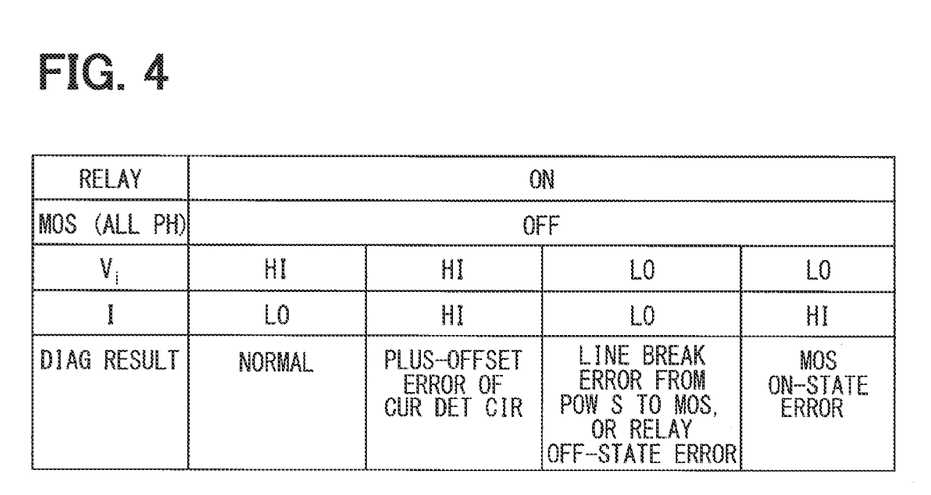
FIG. 4 is a diagram showing a relationship between a detection value of an error detection process and a diagnosis result executed by the electric control apparatus.

The process relating to the error detection of the current detecting circuit 74 executed by the error detecting device 82 is executed at step S120 when the initial error diagnosis is performed. Specifically, when the ignition switch turns on, i.e., when the power source of the vehicle turns on, the shift-by-wire system 1 is activated, and the process is executed.

When the MPU 80 (i.e., the error detecting device 82) turns on the relay 65, and turns off all of the MOS transistors 61-63, the MPU 80 detects the error of the current detecting circuit 74 based on the voltage detected by the voltage detecting circuit 76 and the current detected by the current detecting circuit 74.

Specifically, as shown in FIG. 4, the error detecting device 82 determines that the current detecting circuit 74 is normal when the voltage detected by the voltage detecting circuit 76 is equal to or larger than a predetermined value (i.e., Hi), and the current detected by the current detecting circuit 74 is equal to or smaller than a predetermined value (i.e., Lo). On the other hand, the error detecting device 82 determines that an offset error occurs at the current detecting circuit 74 when the voltage detected by the voltage detecting circuit 76 is equal to or larger than the predetermined value (i.e., Hi), and the current detected by the current detecting circuit 74 is larger than a predetermined value (i.e., Hi). Here, when the offset error occurs at the current detecting circuit 74, an output value is shifted to a positive side (i.e., the value is offset to the positive side).

The error detecting device 82 determines that a line break error in an energization passage from the battery 2 to the MOS transistors 61-63 occurs, or the off error occurs at the relay 65 when the voltage detected by the voltage detecting circuit 76 is smaller than the predetermined value (i.e., Lo), and the current detected by the current detecting circuit 74 is equal to or smaller than a predetermined value (i.e., Lo). Here, when the off error occurs at the relay 65, the relay 65 is always in the off state.

The error detecting device 82 determines that the on error occurs at one of the MOS transistors 61-63 when the voltage detected by the voltage detecting circuit 76 is smaller than the predetermined value (i.e., Lo), and the current detected by the current detecting circuit 74 is larger than a predetermined value (i.e., Hi). Here, when the on error occurs at the MOS transistor 61-63, the MOS transistor 61-63 is always in the on state.

Thus, at a single diagnosis, the error detecting device 82 detects the line break error of the energization passage, the error in the relay 65, and the error in the MOS transistors 61-63 in addition to the error in the current detecting circuit 74.

The MPU 80 (i.e., the error detecting device 82) starts to execute the initial driving control operation at step S140 when the MPU determines in the initial error diagnosis operation at step S120 that the current detecting circuit 74 is normal.

When the MPU 80 (i.e., the error detecting device 82) determines in the initial error diagnosis operation at step S120 that the offset error occurs at the current detecting circuit 74 so that the output value is offset to the positive side, the line break error occurs in the energization passage from the battery 2 to the MOS transistors 61-63, the off-state error occurs at the relay 65 so that the relay 65 is always in the off state, or the on-state error occurs at the MOS transistor 61-63 so that the MOS transistor 61-63 is always in the on state, for example, the display device 7 displays the warning light so that the device 7 notices the error in the shift-by-wire system 1 to the driver. In this case, in the present embodiment, the MPU 80 does not execute the initial driving control operation at step S140, the standard position learning control operation at step S160, and the normal driving control operation at step S180, which are executed at later steps. When the error occurs at the current detecting circuit 74, the standard position learning control operation may be not executed in a normal way.

Thus, the error detecting device 82 functions at step S120 as a malfunction detecting device.

In the present embodiment, for example, in the normal driving control operation at step S180, the voltage is detected by the voltage detecting circuit 76 and the current is detected by the current detecting circuit 74 at the timing when the relay 65 turns on, i.e., the relay 65 is in the on-state in the normal driving control operation, and all of the MOS transistors 61-63 turn off. Thus, the MPU 80 can detect the line break error of the energization passage, the malfunction of the relay 65, and the malfunction of the MOS transistors 61-63 based on the voltage and the current.

Thus, in the present embodiment, the ECU 60 controls the motor 20 that has multiple windings 22 in multiple phases and is rotated by an electric power supplied from the battery 2 so that the motor rotates and drives the detent plate 32. The ECU 60 includes the relay 65, the MOS transistors 61-63, the MPU 80, the current detecting circuit 74, the current limiting circuit 75, the standard position learning device, the voltage detecting circuit 76 and the error detecting device.

The relay 65 is disposed between the battery 2 and the motor 20. When the relay 65 turns on, the relay 65 allows supplying the electricity from the battery 2 to the motor 20. When the relay 65 turns off, the relay 65 interrupts supplying the in the initial error diagnosis operation at step S120. The MOS transistors 61-63 are formed to correspond to the phases of the windings 22, respectively. When the MOS transistor 61-63 turns on, the MOS transistor 61-63 allows the energization to a corresponding winding 22. When the MOS transistor 61-63 turns off, the MOS transistor 61-63 interrupts the energization to the corresponding winding 22. The MPU 80 controls the relay 65 and the MOS transistors 61-63 to turn on and off, the MPU 80 controls the driving operation of the motor 20. The current detecting circuit 74 is connected to the merging point P1, at which the current flowing through the MOS transistors 61-63 and the windings merge. Thus, the circuit 74 detects the current flowing through the merging point P1.

The current limiting circuit 75 restricts the current flowing through the windings 22 and the MOS transistors 61-63 so that the average of the current detected by the current detecting circuit 74 is in a predetermined range. The MPU 80 functions as the standard position learning device such that the MPU 80 limits the current flowing through the windings 22 and the MOS transistors 61-63 using the current limiting circuit 75, the MPU 80 controls the motor 20 to rotate until the detent plate 32 stops at a limit position of a movable range, and the MPU 80 learns the standard position of the motor 20. The voltage detecting circuit 76 detects the voltage applied to the MOS transistors 61-63. The error detecting device 82 in the MPU 80 functions as a malfunction detecting device such that the MPU 80 detects the error in the current detecting circuit 74 based on the voltage detected by the voltage detecting circuit 76 and the current detected by the current detecting circuit 74 when the relay 65 turns on, and all of the MOS transistors 61-63 turns off.

In the present embodiment, when the system 1 learns the standard position of the motor 20, the system 1 restricts the current flowing through the windings 22 and the MOS transistors 61-63 using the current limiting circuit 75 according to the current detected by the current detecting circuit 74, and the system 1 rotates the motor 20. Thus, the system 1 reduces the change of the current caused by the temperature change and/or the chronological change and the change of the torque in the motor 20. Thus, the learning accuracy of the standard position is improved notwithstanding the change of condition such as the temperature change and the chronological change.

In the present embodiment, the error detecting device 82 detects the error in the current detecting circuit 74 based on the voltage detected by the voltage detecting circuit 76 and the current detected by the current detecting circuit 74. Thus, the system 1 avoids to execute the standard position learning process under a condition that the error occurs at the current detecting circuit 74. Accordingly, the system 1 avoids the malfunction and/or loss of control of the motor 20 caused by an erroneously learned standard position.

In the present embodiment, the error detecting device 82 determines that the current detecting circuit 74 functions normally when the voltage detected by the voltage detecting circuit 76 is equal to or larger than the predetermined value, and the current detected by the current detecting circuit 74 is equal to or smaller than the predetermined value. The error detecting device 82 determines that the offset error occurs at the current detecting circuit 74 so that the output value is offset to the positive side when the voltage detected by the voltage detecting circuit 76 is equal to or larger than the predetermined value, and the current detected by the current detecting circuit 74 is larger than the predetermined value. Thus, the malfunction of the current detecting circuit 74 is executed by a comparatively simple method. Thus, the process time is reduced. Further, the process load of the error detecting device 82 is reduced.

In the present embodiment, the error detecting device 82 determines that the line break error occurs in the energization passage from the battery 2 to the MOS transistors 61-63, or the off state error occurs at the relay 65 so that the relay 65 is always in the off state when the voltage detected by the voltage detecting circuit 76 is smaller than the predetermined value, and the current detected by the current detecting circuit 74 is equal to or smaller than the predetermined value.

In the present embodiment, the error detecting device 82 determines that the on state error occurs at the MOS transistor 61-63 so that the MOS transistor 61-63 is always in the on state when the voltage detected by the voltage detecting circuit 76 is smaller than the predetermined value, and the current detected by the current detecting circuit 74 is larger than the predetermined value. Thus, in the present embodiment, in addition to the error in the current detecting circuit 74, the line break error of the energization passage, the error in the relay 65, and the error in the MOS transistors 61-63 are also detected.

In the present embodiment, the shift-by-wire system 1 includes the ECU 60, the motor 20 controlled by the ECU 60, and the detent plate 32 for switching the shift range of the automatic transmission 3 by being rotated and driven with the motor 20. In the present embodiment, the ECU 60 provides the improvement of the accuracy of learning the standard position notwithstanding the condition change such as the temperature change and the chronological change. The system 1 detects the error of the current detecting circuit 74, so that the malfunction of the motor 20 and the loss of control of the motor 20 are avoidable. Thus, the ECU 60 controls the shift-by-wire system 1 effectively.

Other Embodiments

In the previous embodiment, when the system 1 executes the standard position learning control operation, the motor is rotated with the two-phase energizing method such that two phases among three phases of the windings 22 are energized, and the energizing phases are switched in turn. On the other hand, in another embodiment, when the system 1 executes the standard position learning control operation, the motor may be rotated with the one-two-phase energizing method such that a one-phase energizing step for energizing one phase of the winding in three phases and a two-phase energizing step for energizing two phases among three phases of the windings are alternately switched.

In another embodiment, the control object may be a motor having four or more windings corresponding to four or more phases. Alternatively, the motor as the control object may be another brushless synchronous motor other than the switched reluctance motor as long as the rotation position of the motor is detected according to the output signal (i.e., the pulse signal) of the encoder, and the energizing phase is switched.

In the previous embodiment, the encoder for detecting the relative rotation position of the motor is a magnetic type encoder. Alternatively, in another embodiment, for example, the encoder may be an optical type or brush type encoder. The encoder outputs the pulse signal in the A phase or the B phase in the previous embodiment. Alternatively, the encoder may output a Z phase signal as an amendment or an index in addition to the pulse signal in the A phase or the B phase.

In another embodiment, the number of concavities of the detent plate may be different from four. Specifically, the number of ranges of the automatic transmission may be three or less or five or more.

The shift-by-wire system according to the present disclosure may be applied to a continuously variable transmission (i.e., CVT) for switching the P range, the R range, the N range and the D range, an automatic transmission (i.e., A/T) for a hybrid vehicle, a switching range device having a parking mechanism for switching the P range and the not-P range in an electric vehicle or a hybrid vehicle.

In the previous embodiment, the detent mechanism is provided by multiple concavities formed on the detent plate (as a driving object) arranged on the manual shaft and the detent roller. In another embodiment, the detent mechanism including multiple concavities and the detent roller may be arranged near the reducer in the actuator. Alternatively, if the rotation position of the driving object is maintained at a predetermined position, the detent mechanism may be another construction other than the detent mechanism including multiple concavities and the detent roller.

The control apparatus according to the present disclosure may be applied to various switching devices for the synchronous brushless motor as a driving power source in addition to the shift range switching device.

Second Embodiment

Figure 5:
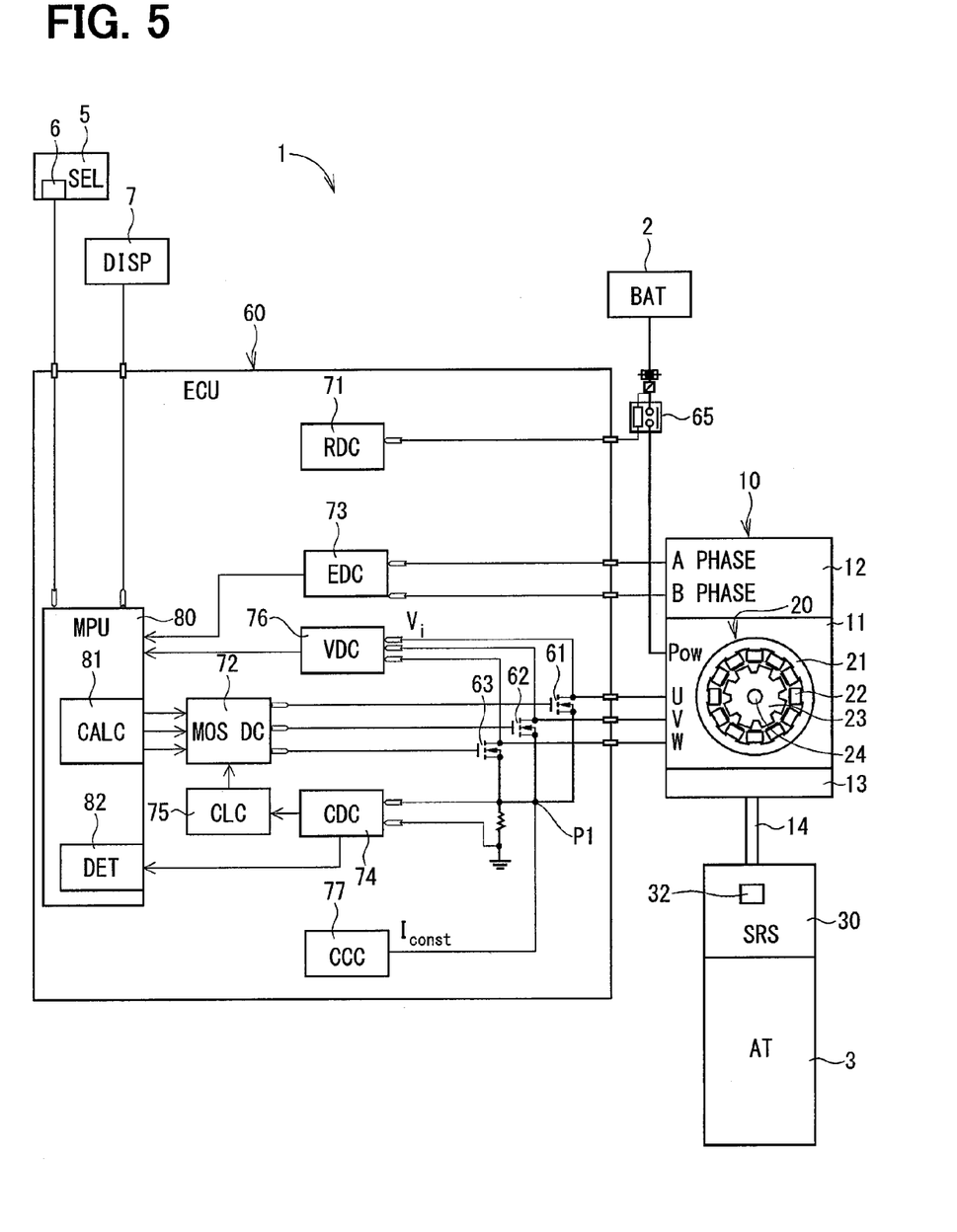
FIG. 5 is a diagram showing a shift-by-wire system having an electric control apparatus according to a second embodiment of the present disclosure.

A control apparatus according to another example embodiment and a shift-by-wire system having the control apparatus are shown in FIG. 5.

Specifically, the ECU 60 includes a relay 65, MOS transistors 61-63, a relay drive circuit 71, a MOS driving circuit 72, an encoder detecting circuit 73, a current detecting circuit 74, a current limiting circuit 75, a voltage detecting circuit 76, a constant current circuit 77 and a MPU 80.

The constant current circuit 77 is connected to the merging point P1. The constant current circuit 77 flows the current, which corresponds to a predetermined constant current (i.e., Iconst), at the merging point P1.

The MPU 80 includes an error detecting device 82 as a functional device. Next, a process relating to the error detection of the current detecting circuit 74 executed by the error detecting device 82 in the MPU 80 will be explained with reference to FIG. 6.

Figure 6:
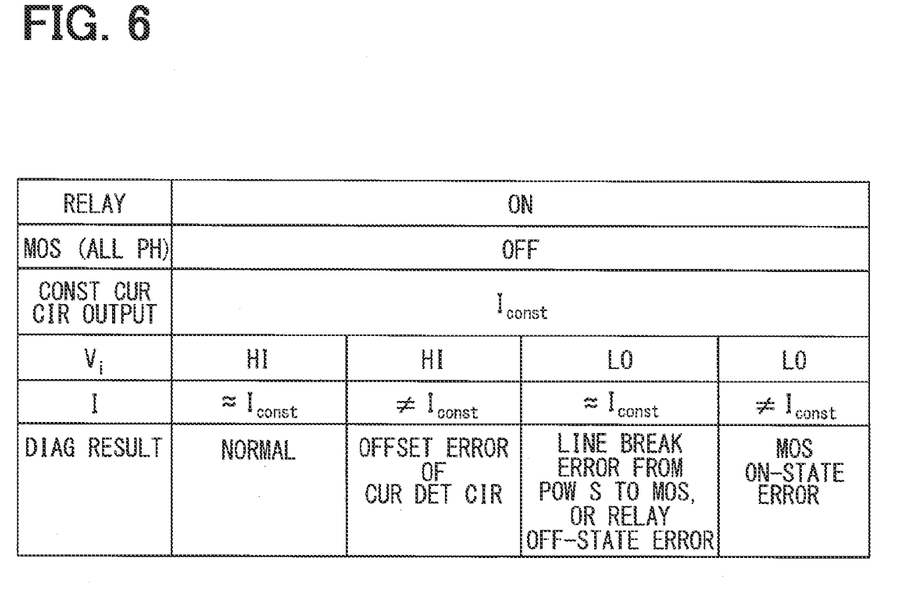
FIG. 6 is a diagram showing a relationship between a detection value of an error detection process and a diagnosis result executed by the electric control apparatus according to the second embodiment of the present disclosure.

The process relating to the error detection of the current detecting circuit 74 executed by the error detecting device 82 is executed at step S120 when the initial error diagnosis is performed. Specifically, when the ignition switch turns on, i.e., when the power source of the vehicle turns on, the shift-by-wire system 1 is activated, and the process is executed.

When the MPU 80 (i.e., the error detecting device 82) turns on the relay 65, turns off all of the MOS transistors 61-63, and controls the constant current circuit 77 to flow the current corresponding to the predetermined constant current Iconst at the merging point P1, the MPU 80 detects the error of the current detecting circuit 74 based on the voltage detected by the voltage detecting circuit 76 and the current detected by the current detecting circuit 74.

Specifically, as shown in FIG. 6, the error detecting device 82 determines that the current detecting circuit 74 is normal when the voltage detected by the voltage detecting circuit 76 is equal to or larger than a predetermined value (i.e., Hi), and the current detected by the current detecting circuit 74 is almost equal to the constant current (i.e., Iconst). Here, when the current detected by the current detecting circuit 74 is almost equal to the constant current (i.e., Iconst), the difference between the current detected by the current detecting circuit 74 and the constant current is within a predetermined difference. On the other hand, the error detecting device 82 determines that an offset error occurs at the current detecting circuit 74 when the voltage detected by the voltage detecting circuit 76 is equal to or larger than the predetermined value (i.e., Hi), and the current detected by the current detecting circuit 74 is different from the constant current by a predetermined value or more (i.e., the difference between the current and the constant current is equal to or larger than the predetermined value). Here, when the offset error occurs at the current detecting circuit 74, an output value is shifted to a positive side or a negative side (i.e., the value is offset to the positive side or the negative side). Here, the error detecting device 82 determines that the offset error occurs at the current detecting circuit 74 so that the output value is offset to the positive side when the voltage detected by the voltage detecting circuit 76 is equal to or larger than the predetermined value (i.e., Hi), and the current detected by the current detecting circuit 74 is larger than the constant current by a predetermined value or more (i.e., the difference between the current and the constant current is equal to or larger than the predetermined value). The error detecting device 82 determines that the offset error occurs at the current detecting circuit 74 so that the output value is offset to the negative side when the voltage detected by the voltage detecting circuit 76 is equal to or larger than the predetermined value (i.e., Hi), and the current detected by the current detecting circuit 74 is smaller than the constant current by a predetermined value or more (i.e., the difference between the current and the constant current is equal to or larger than the predetermined value).

The error detecting device 82 determines that a line break error in an energization passage from the battery 2 to the MOS transistors 61-63 occurs, or the off error occurs at the relay 65 when the voltage detected by the voltage detecting circuit 76 is smaller than the predetermined value (i.e., Lo), and the current detected by the current detecting circuit 74 is almost equal to the constant current (i.e., Iconst). Here, when the off error occurs at the relay 65, the relay 65 is always in the off state.

The error detecting device 82 determines that the on error occurs at one of the MOS transistors 61-63 when the voltage detected by the voltage detecting circuit 76 is smaller than the predetermined value (i.e., Lo), and the current detected by the current detecting circuit 74 is different from the constant current (i.e., Iconst) by a predetermined value or more. Here, when the on error occurs at the MOS transistor 61-63, the MOS transistor 61-63 is always in the on state. Here, when the on error occurs at one of the MOS transistors 61-63, the current detected by the current detecting circuit 74 is larger than the constant current by a predetermined value or more.

Thus, at a single diagnosis, the error detecting device 82 detects the line break error of the energization passage, the error in the relay 65, and the error in the MOS transistors 61-63 in addition to the error in the current detecting circuit 74.

The MPU 80 (i.e., the error detecting device 82) starts to execute the initial driving control operation at step S140 when the MPU determines in the initial error diagnosis operation at step S120 that the current detecting circuit 74 is normal.

When the MPU 80 (i.e., the error detecting device 82) determines in the initial error diagnosis operation at step S120 that the offset error occurs at the current detecting circuit 74 so that the output value is offset to the positive side or the negative side, the line break error occurs in the energization passage from the battery 2 to the MOS transistors 61-63, the off-state error occurs at the relay 65 so that the relay 65 is always in the off state, or the on-state error occurs at the MOS transistor 61-63 so that the MOS transistor 61-63 is always in the on state, for example, the display device 7 displays the warning light so that the device 7 notices the error in the shift-by-wire system 1 to the driver. In this case, in the present embodiment, the MPU 80 does not execute the initial driving control operation at step S140, the standard position learning control operation at step S160, and the normal driving control operation at step S180, which are executed at later steps. When the error occurs at the current detecting circuit 74, the standard position learning control operation may be not executed in a normal way.

Thus, the error detecting device 82 functions at step S120 as a malfunction detecting device.

In the present embodiment, for example, in the normal driving control operation at step S180, the voltage is detected by the voltage detecting circuit 76 and the current is detected by the current detecting circuit 74 at the timing when the relay 65 turns on, i.e., the relay 65 is in the on-state in the normal driving control operation, all of the MOS transistors 61-63 turn off, and the constant current circuit 77 flows the current corresponding to the constant current (i.e., Iconst) at the merging point P1. Thus, the MPU 80 can detect the line break error of the energization passage, the malfunction of the relay 65, and the malfunction of the MOS transistors 61-63 based on the voltage and the current.

In the present embodiment, for example, in the normal driving control operation at step S180, the voltage may be detected by the voltage detecting circuit 76 and the current may be detected by the current detecting circuit 74 at the timing when the relay 65 turns on, i.e., the relay 65 is in the on-state in the normal driving control operation, and all of the MOS transistors 61-63 turn off without flowing the current corresponding to the constant current (i.e., Iconst) at the merging point P1 using the constant current circuit 77. Even in this case, the MPU 80 can detect the line break error of the energization passage, the malfunction of the relay 65, and the malfunction of the MOS transistors 61-63 based on the voltage and the current. Specifically, the error detecting device 82 determines that a line break error in an energization passage from the battery 2 to the MOS transistors 61-63 occurs, or the off error occurs at the relay 65 so that the relay 65 is always in the off state when the voltage detected by the voltage detecting circuit 76 is smaller than the predetermined value (i.e., Lo), and the current detected by the current detecting circuit 74 is equal to or smaller than a predetermined value (i.e., Lo). The error detecting device 82 determines that the on error occurs at one of the MOS transistors 61-63 so that the transistor 61-63 is always in the on state when the voltage detected by the voltage detecting circuit 76 is smaller than the predetermined value (i.e., Lo), and the current detected by the current detecting circuit 74 is larger than a predetermined value (i.e., Hi).

Thus, the error detecting device 82 detects the line break error of the energization passage, the malfunction of the relay 65, and the malfunction of the MOS transistors 61-63 based on the voltage and the current without flowing the current corresponding to the constant current (i.e., Iconst) at the merging point P1 using the constant current circuit 77. In this case, since the constant current circuit 77 dose not flow the current corresponding to the constant current (i.e., Iconst) at the merging point P1, the electricity, which consumes to detect the error, is reduced.

Thus, in the present embodiment, the ECU 60 controls the motor 20 that has multiple windings 22 in multiple phases and is rotated by an electric power supplied from the battery 2 so that the motor rotates and drives the detent plate 32. The ECU 60 includes the relay 65, the MOS transistors 61-63, the MPU 80, the current detecting circuit 74, the current limiting circuit 75, the standard position learning device, the voltage detecting circuit 76, the constant current circuit 77 and the error detecting device.

The current limiting circuit 75 restricts the current flowing through the windings 22 and the MOS transistors 61-63 so that the average of the current detected by the current detecting circuit 74 is in a predetermined range. The MPU 80 functions as the standard position learning device such that the MPU 80 limits the current flowing through the windings 22 and the MOS transistors 61-63 using the current limiting circuit 75, the MPU 80 controls the motor 20 to rotate until the detent plate 32 stops at a limit position of a movable range, and the MPU 80 learns the standard position of the motor 20. The voltage detecting circuit 76 detects the voltage applied to the MOS transistors 61-63. The constant current circuit 77 flows the current corresponding to the constant current (i.e., Iconst) at the merging point P1. The error detecting device 82 in the MPU 80 functions as a malfunction detecting device such that the MPU 80 detects the error in the current detecting circuit 74 based on the voltage detected by the voltage detecting circuit 76 and the current detected by the current detecting circuit 74 when the relay 65 turns on, all of the MOS transistors 61-63 turns off, and the constant current circuit 77 flows the current corresponding to the constant current (i.e., Iconst) at the merging point P1.

In the present embodiment, the error detecting device 82 determines that the current detecting circuit 74 functions normally when the voltage detected by the voltage detecting circuit 76 is equal to or larger than the predetermined value, and the current detected by the current detecting circuit 74 is almost equal to the constant current (i.e., Iconst). The error detecting device 82 determines that the offset error occurs at the current detecting circuit 74 so that the output value is offset to the positive side or the negative side when the voltage detected by the voltage detecting circuit 76 is equal to or larger than the predetermined value, and the current detected by the current detecting circuit 74 is different from the constant current (i.e., Iconst) by the predetermined value or more. Thus, the malfunction of the current detecting circuit 74 is executed by a comparatively simple method. Thus, the process time is reduced. Further, the process load of the error detecting device 82 is reduced.

In the present embodiment, the error detecting device 82 determines that the offset error occurs at the current detecting circuit 74 so that the output value is offset to the positive side when the voltage detected by the voltage detecting circuit 76 is equal to or larger than the predetermined value, and the current detected by the current detecting circuit 74 is larger than the constant current (i.e., Iconst) by the predetermined value or more. In the present embodiment, the error detecting device 82 determines that the offset error occurs at the current detecting circuit 74 so that the output value is offset to the negative side when the voltage detected by the voltage detecting circuit 76 is equal to or larger than the predetermined value, and the current detected by the current detecting circuit 74 is smaller than the constant current (i.e., Iconst) by the predetermined value or more. Thus, in the present embodiment, the error detecting device 82 distinguishes whether the offset error in the current detecting circuit 74 is a positive offset error for shifting to the positive side or a negative offset error for shifting to the negative side according to the current detected by the current detecting circuit 74.

In the present embodiment, the error detecting device 82 determines that the line break error occurs in the energization passage from the battery 2 to the MOS transistors 61-63, or the off state error occurs at the relay 65 so that the relay 65 is always in the off state when the voltage detected by the voltage detecting circuit 76 is smaller than the predetermined value, and the current detected by the current detecting circuit 74 is almost equal to the constant current (i.e., Iconst).

In the present embodiment, the error detecting device 82 determines that the on state error occurs at the MOS transistor 61-63 so that the MOS transistor 61-63 is always in the on state when the voltage detected by the voltage detecting circuit 76 is smaller than the predetermined value, and the current detected by the current detecting circuit 74 is different from the constant current (i.e., Iconst) by the predetermined value or more.

Thus, in the present embodiment, in addition to the error in the current detecting circuit 74, the line break error of the energization passage, the error in the relay 65, and the error in the MOS transistors 61-63 are also detected.

In the present embodiment, the shift-by-wire system 1 includes the ECU 60, the motor 20 controlled by the ECU 60, and the detent plate 32 for switching the shift range of the automatic transmission 3 by being rotated and driven with the motor 20. In the present embodiment, the ECU 60 provides the improvement of the accuracy of learning the standard position notwithstanding the condition change such as the temperature change and the chronological change. The system 1 detects the error of the current detecting circuit 74, so that the malfunction of the motor 20 and the loss of control of the motor 20 are avoidable. Thus, the ECU 60 controls the shift-by-wire system 1 effectively.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control apparatus that controls a motor, which has a plurality of windings respectively corresponding to a plurality of phases, and is supplied an electric power from a power source so that the motor rotates, for rotating and driving an object, the control apparatus comprising:
   a relay, which is arranged between the power source and the motor, allows electric power supply from the power source to the motor when the relay turns on, and interrupts the electric power supply from the power source to the motor when the relay turns off;
   a plurality of switching devices, each of which corresponds to one of the plurality of phases, allows energization to a corresponding winding when the switching device turns on, and interrupts the energization to the corresponding winding when the switching device turns off;
   a controller that controls the relay and the switching devices to turn on and off so that the controller controls an operation of the motor;
   a current detecting circuit that is connected to a merging point, at which current flowing through the windings and the switching devices merge, and detects a current flowing through the merging point;
   a current limit circuit that limits the current flowing through each winding and each switching device to keep an average of the current detected by the current detecting circuit within a predetermined range;
   a standard position learning device that learns a standard position of the motor in such a manner that the current limit circuit limits the current flowing through each winding and each switching device, and the controller controls the motor to rotate until the object stops at a limit position of a movable range;
   a voltage detecting circuit that detects a voltage applied to each switching device; and
   an error detecting device that detects an error in the current detecting circuit based on the voltage detected by the voltage detecting circuit and the current detected by the current detecting circuit when the relay turns on, and all of the switching devices turn off.

2. The control apparatus according to claim 1,
   wherein the error detecting device determines that the current detecting circuit is normal when the voltage detected by the voltage detecting circuit is equal to or larger than a predetermined voltage, and the current detected by the current detecting circuit is equal to or smaller than a predetermined current,
   wherein the error detecting device determines that an offset error occurs at the current detecting circuit when the voltage detected by the voltage detecting circuit is equal to or larger than the predetermined voltage, and the current detected by the current detecting circuit is larger than the predetermined current, and
   wherein, when the offset error occurs at the current detecting circuit, an output value is shifted to a positive side.

3. The control apparatus according to claim 1,
   wherein the error detecting device determines that a line break error occurs in an energization passage between the power source and the switching devices, or an off-state error occurs at the relay when the voltage detected by the voltage detecting circuit is smaller than the predetermined voltage, and the current detected by the current detecting circuit is equal to or smaller than the predetermined current, and
   wherein, when the off-state error occurs at the relay, the relay is always in an off-state.

4. The control apparatus according to claim 1,
   wherein the error detecting device determines that an on-state error occurs at one of the switching devices when the voltage detected by the voltage detecting circuit is smaller than the predetermined voltage, and the current detected by the current detecting circuit is larger than the predetermined current, and
   wherein, when the on-state error occurs at the one of the switching devices, the one of the switching devices is always in an on-state.

5. The control apparatus according to claim 1, further comprising:
   a constant current circuit for flowing a current, which corresponds to a predetermined constant current, at the merging point,
   wherein the error detecting device detects the error in the current detecting circuit based on the voltage detected by the voltage detecting circuit and the current detected by the current detecting circuit when the relay turns on, all of the switching devices turn off, and the constant current circuit flows the current corresponding to the predetermined constant current at the merging point.

6. The control apparatus according to claim 5,
   wherein the error detecting device determines that the current detecting circuit is normal when the voltage detected by the voltage detecting circuit is equal to or larger than a predetermined voltage, and the current detected by the current detecting circuit is almost equal to the constant current,
   wherein the error detecting device determines that an offset error occurs at the current detecting circuit when the voltage detected by the voltage detecting circuit is equal to or larger than the predetermined voltage, and the current detected by the current detecting circuit is different from the constant current by a predetermined value or more, and
   wherein, when the offset error occurs at the current detecting circuit, an output value is shifted to a positive side or a negative side.

7. The control apparatus according to claim 6,
wherein the error detecting device determines that a positive offset error occurs at the current detecting circuit so that the output value is shifted to the positive side when the voltage detected by the voltage detecting circuit is equal to or larger than the predetermined voltage, and the current detected by the current detecting circuit is larger than the constant current by the predetermined value or more, and
wherein the error detecting device determines that a negative offset error occurs at the current detecting circuit so that the output value is shifted to the negative side when the voltage detected by the voltage detecting circuit is equal to or larger than the predetermined voltage, and the current detected by the current detecting circuit is smaller than the constant current by the predetermined value or more.

8. The control apparatus according to claim 5,
wherein the error detecting device determines that a line break error occurs in an energization passage between the power source and the switching devices, or an off-state error occurs at the relay when the voltage detected by the voltage detecting circuit is smaller than the predetermined voltage, and the current detected by the current detecting circuit is almost equal to the constant current, and
wherein, when the off-state error occurs at the relay, the relay is always in an off-state.

9. The control apparatus according to claim 5,
wherein the error detecting device determines that an on-state error occurs at one of the switching devices when the voltage detected by the voltage detecting circuit is smaller than the predetermined voltage, and the current detected by the current detecting circuit is different from the constant current by the predetermined value or more, and
wherein, when the off-state error occurs at the relay, the relay is always in an off-state.

10. A shift-by-wire system comprising:
a control apparatus;
a motor controlled by the control apparatus; and
an object rotated and driven by the motor,
wherein the motor rotates and drives the object to switch a shift range,
wherein the control apparatus has a plurality of windings respectively corresponding to a plurality of phases, and is supplied an electric power from a power source so that the motor rotates,
wherein the control apparatus includes:
 a relay, which is arranged between the power source and the motor, allows electric power supply from the power source to the motor when the relay turns on, and interrupts the electric power supply from the power source to the motor when the relay turns off;
 a plurality of switching devices, each of which corresponds to one of the plurality of phases, allows energization to a corresponding winding when the switching device turns on, and interrupts the energization to the corresponding winding when the switching device turns off;
 a controller that controls the relay and the switching devices to turn on and off so that the controller controls an operation of the motor;
 a current detecting circuit that is connected to a merging point, at which current flowing through the windings and the switching devices merge, and detects a current flowing through the merging point;
 a current limit circuit that limits the current flowing through each winding and each switching device to keep an average of the current detected by the current detecting circuit within a predetermined range;
 a standard position learning device that learns a standard position of the motor in such a manner that the current limit circuit limits the current flowing through each winding and each switching device, and the controller controls the motor to rotate until the object stops at a limit position of a movable range;
 a voltage detecting circuit that detects a voltage applied to each switching device; and
 an error detecting device that detects an error in the current detecting circuit based on the voltage detected by the voltage detecting circuit and the current detected by the current detecting circuit when the relay turns on, and all of the switching devices turn off.

11. The shift-by-wire system according to claim 10,
wherein the error detecting device determines that the current detecting circuit is normal when the voltage detected by the voltage detecting circuit is equal to or larger than a predetermined voltage, and the current detected by the current detecting circuit is equal to or smaller than a predetermined current,
wherein the error detecting device determines that an offset error occurs at the current detecting circuit when the voltage detected by the voltage detecting circuit is equal to or larger than the predetermined voltage, and the current detected by the current detecting circuit is larger than the predetermined current, and
wherein, when the offset error occurs at the current detecting circuit, an output value is shifted to a positive side.

12. The shift-by-wire system according to claim 10,
wherein the error detecting device determines that a line break error occurs in an energization passage between the power source and the switching devices, or an off-state error occurs at the relay when the voltage detected by the voltage detecting circuit is smaller than the predetermined voltage, and the current detected by the current detecting circuit is equal to or smaller than the predetermined current, and
wherein, when the off-state error occurs at the relay, the relay is always in an off-state.

13. The shift-by-wire system according to claim 10,
wherein the error detecting device determines that an on-state error occurs at one of the switching devices when the voltage detected by the voltage detecting circuit is smaller than the predetermined voltage, and the current detected by the current detecting circuit is larger than the predetermined current, and
wherein, when the on-state error occurs at the one of the switching devices, the one of the switching devices is always in an on-state.

14. The shift-by-wire system according to claim 10, further comprising:
a constant current circuit for flowing a current, which corresponds to a predetermined constant current, at the merging point,
wherein the error detecting device detects the error in the current detecting circuit based on the voltage detected by the voltage detecting circuit and the current detected by the current detecting circuit when the relay turns on, all of the switching devices turn off, and the constant current circuit flows the current corresponding to the predetermined constant current at the merging point.

15. The shift-by-wire system according to claim 14,
wherein the error detecting device determines that the current detecting circuit is normal when the voltage detected by the voltage detecting circuit is equal to or larger than a predetermined voltage, and the current detected by the current detecting circuit is almost equal to the constant current,
wherein the error detecting device determines that an offset error occurs at the current detecting circuit when the voltage detected by the voltage detecting circuit is equal to or larger than the predetermined voltage, and the current detected by the current detecting circuit is different from the constant current by a predetermined value or more, and
wherein, when the offset error occurs at the current detecting circuit, an output value is shifted to a positive side or a negative side.

16. The shift-by-wire system according to claim 15,
wherein the error detecting device determines that a positive offset error occurs at the current detecting circuit so that the output value is shifted to the positive side when the voltage detected by the voltage detecting circuit is equal to or larger than the predetermined voltage, and the current detected by the current detecting circuit is larger than the constant current by the predetermined value or more, and
wherein the error detecting device determines that a negative offset error occurs at the current detecting circuit so that the output value is shifted to the negative side when the voltage detected by the voltage detecting circuit is equal to or larger than the predetermined voltage, and the current detected by the current detecting circuit is smaller than the constant current by the predetermined value or more.

17. The shift-by-wire system according to claim 14,
wherein the error detecting device determines that a line break error occurs in an energization passage between the power source and the switching devices, or an off-state error occurs at the relay when the voltage detected by the voltage detecting circuit is smaller than the predetermined voltage, and the current detected by the current detecting circuit is almost equal to the constant current, and
wherein, when the off-state error occurs at the relay, the relay is always in an off-state.

18. The shift-by-wire system according to claim 14,
wherein the error detecting device determines that an on-state error occurs at one of the switching devices when the voltage detected by the voltage detecting circuit is smaller than the predetermined voltage, and the current detected by the current detecting circuit is different from the constant current by the predetermined value or more, and
wherein, when the off-state error occurs at the relay, the relay is always in an off-state.

* * * * *